US008028052B2

United States Patent
Larkin et al.

(10) Patent No.: US 8,028,052 B2
(45) Date of Patent: Sep. 27, 2011

(54) NMS WITH MULTI-SERVER CHANGE REQUESTS PROCESSING

(75) Inventors: James Larkin, Nepean (CA); Robert J. Larkin, legal representative, Nepean (CA); Brian Gunther, Stittsville (CA); Hubert Holierhoek, Carp (CA)

(73) Assignee: Alcatel Lucent, Paris (FR)

( * ) Notice: Subject to any disclaimer, the term of this patent is extended or adjusted under 35 U.S.C. 154(b) by 1929 days.

(21) Appl. No.: 10/888,535

(22) Filed: Jul. 9, 2004

(65) Prior Publication Data

US 2006/0036722 A1    Feb. 16, 2006

(51) Int. Cl.
*G06F 15/173* (2006.01)
(52) U.S. Cl. .......................... 709/223; 709/226
(58) Field of Classification Search .................. 709/223, 709/226; 718/105
See application file for complete search history.

(56) References Cited

U.S. PATENT DOCUMENTS

| | | | | |
|---|---|---|---|---|
| 5,721,825 A | * | 2/1998 | Lawson et al. | 709/203 |
| 5,832,484 A | * | 11/1998 | Sankaran et al. | 707/8 |
| 5,924,096 A | * | 7/1999 | Draper et al. | 707/10 |
| 6,085,200 A | * | 7/2000 | Hill et al. | 707/202 |
| 6,275,863 B1 | * | 8/2001 | Leff et al. | 709/248 |
| 6,493,756 B1 | * | 12/2002 | O'Brien et al. | 709/224 |
| 6,584,502 B1 | | 6/2003 | Natarajan et al. | |
| 6,678,244 B1 | * | 1/2004 | Appanna et al. | 370/229 |
| 2002/0143923 A1 | * | 10/2002 | Alexander | 709/223 |
| 2003/0126162 A1 | * | 7/2003 | Yohe et al. | 707/201 |
| 2003/0231647 A1 | | 12/2003 | Petrovykh | |
| 2005/0229183 A1 | * | 10/2005 | Araujo et al. | 719/310 |

OTHER PUBLICATIONS

Douglas C. Schmidt: "An Overview of the Real-time CORBA Specification": IEEE Computer; Online; Jun. 2000; XP002353626.

* cited by examiner

*Primary Examiner* — Carl Colin
*Assistant Examiner* — Chau Le
(74) *Attorney, Agent, or Firm* — Ross D. Snyder & Associates, Inc.

(57) ABSTRACT

An event processing system performs quickly processing of events in a communication network. The system comprises a client process that controls the sequencing of event processing, a plurality of servers that process the events with the help of a shared object library and a dispatcher that selects an available server so that no two servers process events from the same event queue at any given time. The client time-stamps the events and organizes them into event queues per node, using a node identification. An outstanding queue tracks the current events being processed for a node based on a message ID that is returned by the dispatcher when an event is sent to a server. Also, an overflow queue tracks the sequence of nodes to be serviced after a maximum outstanding limit of events being processed at a given time has been reached.

32 Claims, 5 Drawing Sheets

NMS WITH MULTI-SERVER CHANGE REQUESTS PROCESSING

FIELD OF THE INVENTION

The invention is directed to communication networks and in particular to a network management system (NMS) enabling multi-server change requests processing.

BACKGROUND OF THE INVENTION

Modern networks are comprised of heterogeneous network devices, the physical hardware connections between the network devices, and the software used to send, receive and switch/route data. The configuration of the communication network evolves as new devices and services are added, existing devices are re-located, and obsolete devices are removed.

It is known to provide the network with a network management system (NMS) for monitoring operational behavior of the network as a whole and controlling the operation of the individual network devices and the traffic flow. The monitoring objective is achieved by collecting device specification data, device connectivity data, information about the capacity and relative utilization of communications links among the devices, the extent and locations of faults or problems in the network such as traffic congestion and data loss, etc. The NMS assembles this data in a master database that provides a centralized view of the network.

On the control side, network management systems are utilized to configure the network devices in accordance with a plan of network operation, and to operate the network devices by correlating the events and conditions that span network elements and sub-networks.

Inspired by the technological and architectural advances in data communication and the need to develop and deploy highly scalable new services in a rapid and cost-effective manner, network management systems are rapidly evolving toward highly distributed, multi-vendor systems, with open interfaces, and applications that are independent from the underlying transport technologies. The modern network managers maintain in the master database a complete and up-to-date representation of the network and the technologies involved, and are equipped with advanced user-network interface, such as a GUI (graphical user interface), that enable a user to view this information and to interact with the network.

For network management systems to be effective, it is important that they maintain accurate information regarding the operation of the managed devices. In general, if the NMS has been used to configure a network device, it infers that the device's operational configuration is that resulted from the stream of configuration commands sent to the device from the network management system. To achieve this, the device acknowledges to the NMS if any change has been in fact implemented in order to ensure that device information in the node database and in the network management database is accurate and synchronized.

As a result, a major challenge for the NMS is the high volume of messages and the requirement to process the messages in sequence. It is also common today for a network management system to support large networks with over 1,000 nodes (such as e.g. Telemar, SBC, Telus, etc). As the network grows by aggregating sub-networks of different technologies and configurations, and as the network devices evolve to perform more complex tasks, the load on network management systems to process network change notifications and reflect these changes in the master database and node databases increases accordingly. It is critical that database changes be processed in the order in which they are received because otherwise the NMS database would not accurately reflect the condition of the network nodes and consequently the NMS would lose its ability to manage the network.

There is a growing need to provide solutions to improve event processing performance required by message/event processing applications, to enable the NMS to dynamically respond to changing load conditions for providing optimal performance and processing capabilities usage tradeoff.

The current event processing systems perform sequential processing of events and/or messages. For example, U.S. Pat. No. 6,493,756 (O'Brien et al.) "System and method for dynamically sensing an asynchronous network event within a modular framework for network event processing", issued on Dec. 10, 2002 and assigned to Networks Associates, Inc. describes a single-threaded architecture whereby a queue of network events is processed sequentially. Network event messages are received by a listener thread and placed in a holding structure. Each received message is removed from the holding structure via a handler thread. An action set mapping corresponding to each received message is retrieved for a generator process, which creates an action set. The generated action set is placed into an event queue for processing, which is done sequentially by invoking a process method on each set.

There is also a current trend towards multi-threaded (parallel) message processing architectures in an attempt to meet the high volume processing requirements. However, while parallel processing addresses well the requirement of processing a high volume of messages, it does not lend itself easily to processing the messages in sequence. Since message sequencing at the node level must be maintained, which is the characterizing queuing feature of any message processing architecture, workarounds are few, and not satisfactory.

SUMMARY OF THE INVENTION

It is an object of the invention to provide a method and system for quickly processing network change notification messages that alleviates totally or in part the drawbacks of the existing methods and systems.

The present invention is directed to an event processing system (EPS) for a communication network of the type having a master database and a plurality of local database at respective network nodes. The event processing system comprises: a message processing client for placing a plurality of events sequentially in a plurality of event queues, an event queue per node; a plurality of message processing servers, one server for processing at a given time an event from a particular event queue relating to a particular node, generating a certain change request for the certain event and transmitting the certain change request to a specified database; and a dispatcher for selecting the one server based on availability of the message processing servers at the given time, so that no other server of the plurality of message processing servers processes another event from the particular event queue at the given time.

According to another aspect, the invention is directed to a method of processing a plurality of network events in a communication network of the type having a master database and a plurality of local databases at respective network nodes, a method of processing a plurality of network events. The method comprises the steps of: a) maintaining a plurality of event queues at a message processing client, a particular event queue being associated to a particular network node; and b) dispatching the events from each of the event queues to a plurality of message processing servers; and c) processing simultaneously the events at the message processing servers, one server for processing a certain event from the particular event queue, while no other server of the plurality of message processing servers processes another event from the particular event queue during the time the one server processes the event.

Advantageously, the invention enables a better performance of the network management system with respect to event processing, since this multiple server-single client architecture can process messages faster while maintaining message sequencing.

Also, the system of the invention is dynamically reconfigurable, being able to adapt to changes in messaging traffic volume.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
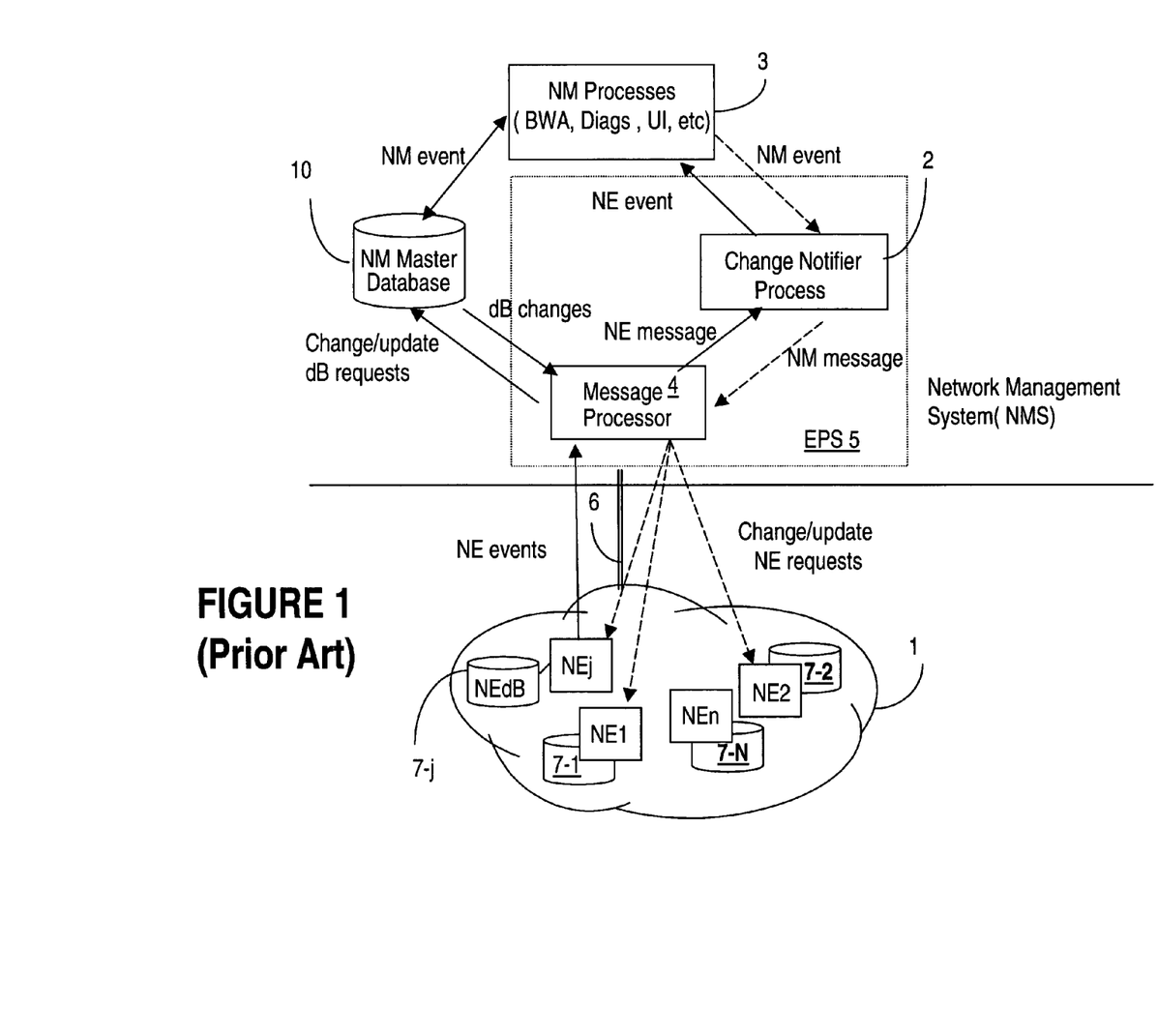
FIG. 1 is a high level view of a current event notification system (Prior Art)

A description of a current event notification system is provided next for better understanding the advantages of the solution proposed by the present invention. FIG. 1 shows a communication network 1 equipped with a network management system (NMS) which monitors operational behavior of the network as a whole and controls the operation of the NEs and the traffic flow. FIG. 1 shows only the parts of the NMS that are relevant to the invention, namely an event processing system (EPS) 5, a master database 10, and a NM processes block 3.

Thus, the NMS provides a centralized view of the network under its control, which is stored and maintained in master database (also called herein "NM database") 10. NM processes unit 3 includes collectively all the processes in the NMS that are relevant to the invention, in that they trigger events that update master database 10. Such NM processes are for example the user interface (e.g. a GUI), a diagnostic module, a bandwidth allocator (BWA), etc. This specification uses the term "network event" for events triggered by processes 3.

Network 1 is in this example a large network, as illustrated by a plurality of network elements NE1, NE2, ... NEj, ... NEn, with associated databases 7. It is to be noted that the term NE here refers to NE's managed by the NMS over a network control interface (NCI) interface 6, shown by a double line in FIG. 1. This interface is an application level protocol used to manage the network. Also, the NE's are alternatively called "network nodes".

If a NM process 3 generates a network event, the master database 10 is modified according to the change requested by the respective process 3. In order to perform the respective change in the local database(s) of the affected NE(s), a change notifier (CHN) process 2, provided by the event processing system 5, detects the network events generated by the NM processes 3 and provides corresponding messages to a message processor 4. The message processor 4 receives the messages and advertises them to the respective network elements sequentially and in the order of the message arrival. As indicated above, it is critical that network events notifications and the change requests are processed in the order in which they are received at the message processor 4, because otherwise the affected databases would not accurately reflect the condition of the network nodes.

For example, if an operator effects a change to network elements NE1, NE2 and NEj in response to a request from the GUI, included in the processes of NM processes unit 3, the change is immediately reflected in database 10, and at the same time the EPS 5 receives the network event and broadcasts the network change to NE1, NE2 and NEj over network 1 using message processor 4. As a result, the affected network elements NE1, NE2 and NEj implement the change in the respective databases 7-1, 7-2 and 7-j.

All events that take place in the network (e.g. alarms, or addition, upgrade, removal of NEs) must also be recorded in the master database 10, for synchronizing the master database with the databases of the NEs that generated the event. This specification uses the term "NE event" for events at a network node that result in changes in the respective local database. In this case, the message processor 4 receives a NE event notification from the respective network node, and interfaces with the database 10 to request database change to reflect the event. As before, the changes are processed sequentially, so that the master database 10 always reflects correctly the current network configuration and state. The message processor 4 also transmits the network event message to the CHN 2 for broadcasting the event to the processes 3 that are interested in it.

For example, if NE1 received a hardware update, this network event is transmitted over NCI interface 6 to message processor 4, which modifies master database 10 to reflect the new configuration of NE1. The message processor 4 also advises the CHN 2 of the event, and the CHN 2 provides this information to the affected processes, such as e.g. the bandwidth allocator if the hardware update affected the bandwidth of NE1, and eventually to the GUI to advise the operator of the change.

The problem with the approach of FIG. 1 is that the message processor 4 constitutes a single process responsible for both handling all network events entering the NMS from network elements, and for propagating change requests from the NM processes 3 to the network elements. As only a single event could be processed at one time by processor 4, the number of waiting events could become quite large in case of a large network. In addition, since generally the NEs that are connected over the network control interface 6 are equipped with a re-send timer of 15 seconds, an event is retransmitted if a response (acknowledgement that the event has been processed successfully) has not been received within that time limit. As a result, this solution did not scale well to the number of events generated by the large sized customer networks.

Figure 2:
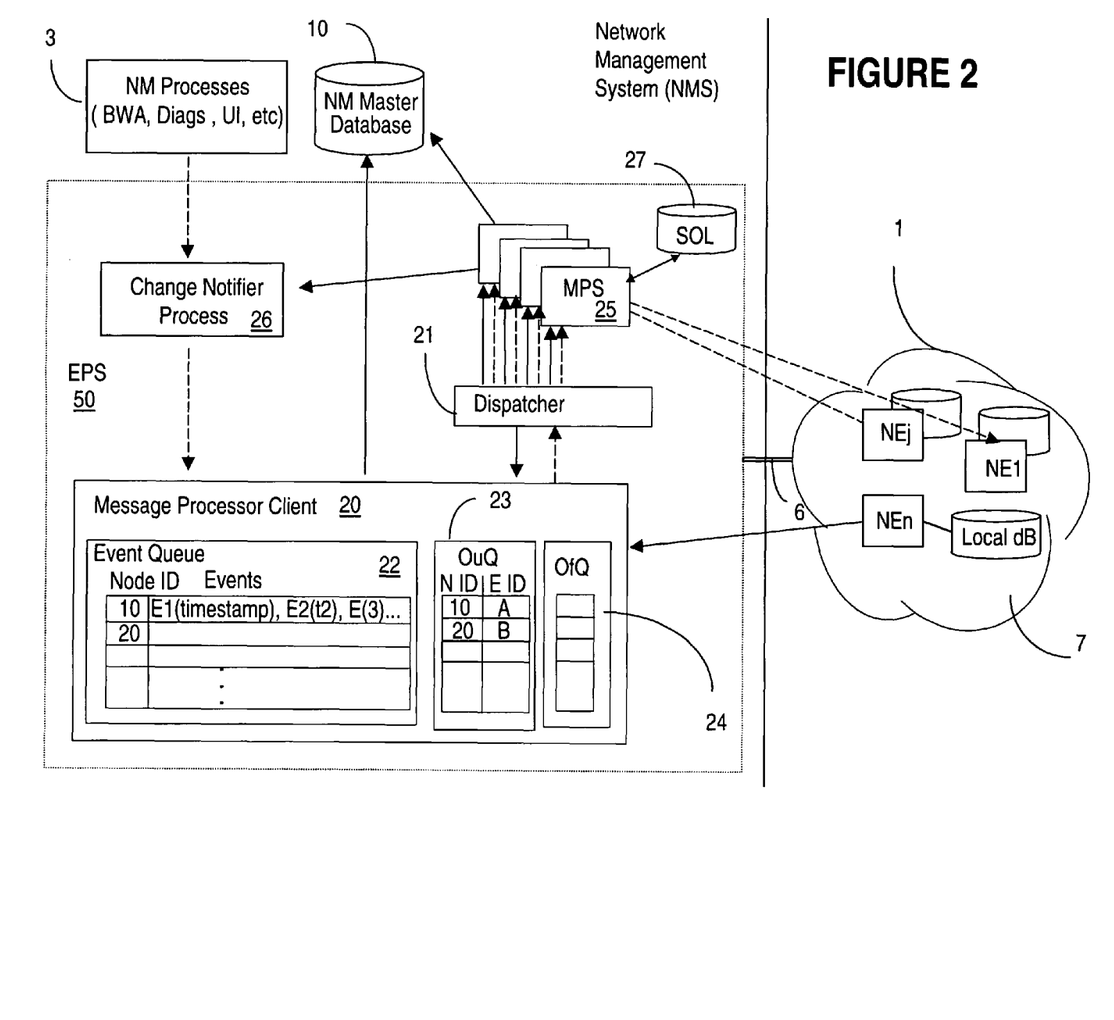
FIG. 2 shows a high level view of an embodiment of the event notification system of the invention.

In order to improve the event handling rate of the MP 4, the present invention proposes an event processing system 50 based on parallel event processing, which still takes into account the event order, as shown in FIG. 2. The new message processing system has a client-server architecture, and more precisely, includes a message processing client (MPC) 20 and multiple message processing servers (MPS) 25. MPC 20 controls the sequencing of message processing, while MPS's 25 perform the actual message processing with the help of a shared object library 27, which contains specific processing instructions for each message type handled by the servers 25.

The message processing client (also referred to as "client process") 20 is the entry point for all events within network 1 received over the NCI interface 6, and all network events affecting the master database 10. The main task of MPC 20 is to wait for change events from either the CHN (change notifier) 26 or from the network elements NE1-NEn. Events are queued, one queue per node, so that events for, or from different NEs may be processed in parallel. Once the queues are set, the messages are forwarded to a dispatcher 21 for distribution to a free server for time-based processing.

The message processing servers 25 (also called herein server processes) are responsible for the bulk of the event processing received from the MPC 20 through dispatcher 21; management of the servers is handled entirely by the dispatcher. Each server 25 either updates the NM database 10 in response to a network event, or the NEs databases 7 in response to a network event. The NE events are dispatched to handler functions of the respective MPS based on a class and item provided in the master parameter list (MPL) contained the packet describing the event. (MPL is a list of all parameters addressable on all nodes, being identified by the class and item numbers.) A higher number of MPS's 25 allows for more events to be processed in parallel. The number of servers is dynamically configurable to accommodate changes in the message-processing load.

More specifically, a MPS 25 has three main functions. The first function is to translate the incoming network events and update the corresponding fields within the master database 10. The second function is to translate a network event into an NCI event and transmit to a corresponding NE over NCI (network control interface) 6. The third task is to request additional information from a network element if the translation routine of an incoming Network event requires more information.

These two processes 20, 25 communicate using dispatcher 21, which selects an available server among the server instances and distributes the messages to the servers for processing. The dispatcher then returns a message identification to the client process 20 for tracking the message. In the case of network events, more data may be required from the NEs; in this case the respective server reads the additional data directly from the respective node as needed.

As indicated above, the client process 20 is responsible for collecting all NE and network events. Preferably, the client process 20 maintains preferably three queues to control the sequencing of the message processing performed by the server processes 25.

A hierarchical event queue 22 is organized by node using a node identifier (node ID) so that it has a queue for each node that currently has messages for processing. Within each node queue are event notifications pertaining to that node, which are time-stamped to ensure processing according to the order in which the notifications were received. Ordering of event processing is ensured by the fact that the client 20 can only have one event per node sent to the dispatcher 21 at any given time.

Message processing client 20 also maintains an outstanding queue 23, which tracks the current event being processed for a node. This is done using a message identifier (message ID) that is allocated to each message, and which is returned by the dispatcher 21 when a message is sent to a server process 25. There is a limit to the maximum number of nodes that can have events being processed at any one time. This limit, referred to as the maximum outstanding limit, depends on the number of server processes, being also dynamically configurable based on message-processing load.

An overflow queue 24 is also created, to allow MPC 20 to continue to process events even when it is overrun with events. Overflow queue 24 tracks the sequence of nodes to be serviced after the maximum outstanding limit has been reached, using again the node ID. This queue is needed because the event queue does not have sequencing at the node level.

The message processing client 20 and servers 25 are preferably equipped with metrics collection capabilities to monitor event handling within the system. The client 20 may for example collect statistics on the total number of events received, the total number of events queued and the total number of events dropped due to a timeout within the event queue. It also keeps metrics on the total turnaround time a packet takes within the system from the time it is received to the time the event has been acknowledged back to the sending NE. The servers 25 collect metrics on the amount of time each individual event takes to process and the number of events received/processed over a period of time. These timings are stored by node type, MPL (master parameter list) class and item number. Each of these metrics is used to get an overall event rate for the message notification system 5.

Experiments show that handling of each individual event can take varying lengths of time depending on the event type. This is mainly due to the amount of network or database access the event handling may need to perform as a side effect of the event received. For example, in the case of a port name event, once the name is translated into a string, it is simply updated in the database. A card status event requires a number of side tasks be performed before the status can be updated in the database. Some of these tasks include listing all ports on the card and all cables on those ports and setting each cable's status to "down" or "up", depending on the status received.

In addition, some individual NE events take much longer than the fifteen second time limit currently allocated to this process. For example, in the case a "programmed card type MPL" event is received for any card, all database records related to that card must be created in the database 10. For large cards containing large numbers of ports and circuits, creation or deletion of these records can take minutes, depending on the card type. Event handling is blocked for that particular node for the time a current event is processed, but the architecture of the invention allows the event processing system 50 to continue processing events for other network elements.

Currently, the message processor 4 (see FIG. 1) only has knowledge of the event it is handling, and the sending NE queues all other NE messages, until a response is received for that event. As a result, the network elements continuously send events as long as the event persists. An enhancement to the message notification system 50 according to the invention is to allow identification of duplicate incoming NE events. These events generally come from equipment in the network whose status is bouncing. Once an event has been identified as being from a 'bouncing' object, that event could be filtered until the problem with the respective equipment is solved. To this end, the message processing client 20 acknowledges all NCI events immediately upon receiving them. In this way, notifier 26 has visibility of the node buffer of events.

Figure 3A:
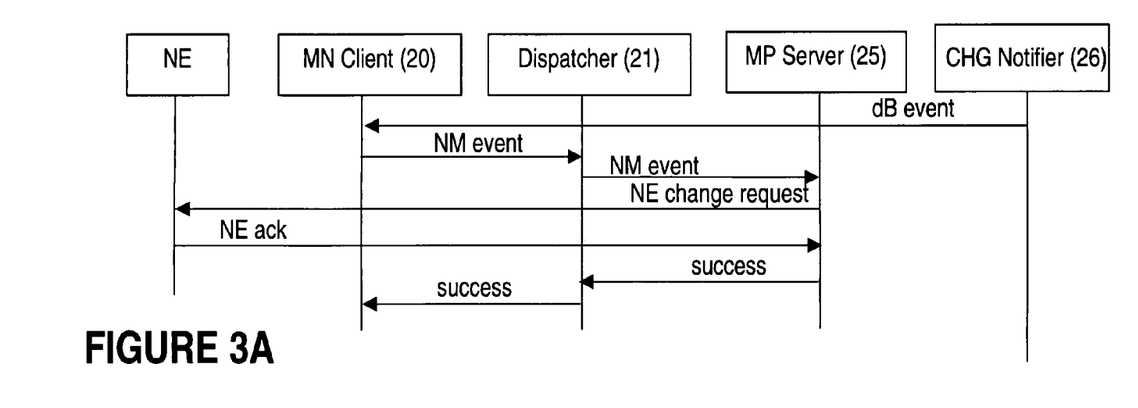
FIG. 3A illustrates the sequence for processing a network event.

FIG. 3A depicts the sequence of operations that occurs when an update is performed on the master database 10. It starts with the client process 20 receiving from the CHN 26 a notification of the network event and in response, requesting a server to process the event. The dispatcher forwards the request to an available server process 25. The server translates the network event into the appropriate MPL message and issues an NE change request to the NE. The MPL message is then written to the respective local database and the change request is acknowledged. Upon receiving the acknowledgement, the server 25 returns a success code which is forwarded to client 20.

Figure 3B:
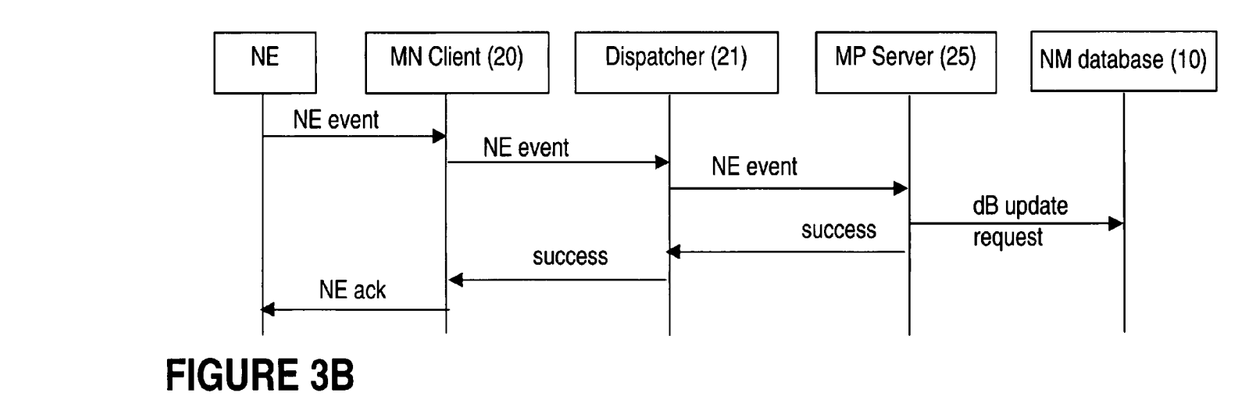
FIG. 3B shows the sequence for processing a network element (NE) event.

FIG. 3B depicts the sequence that occurs when an update is performed on a NE database 7. It starts with the client process 20 receiving the NE event, upon which the client requests a server to process the event; the dispatcher 21 forwards the request to an available server 25. The server translates the NE event into an appropriate database update request, and returns a success code which is forwarded to client process 20, which acknowledges the change to the NE.

Figure 4A:
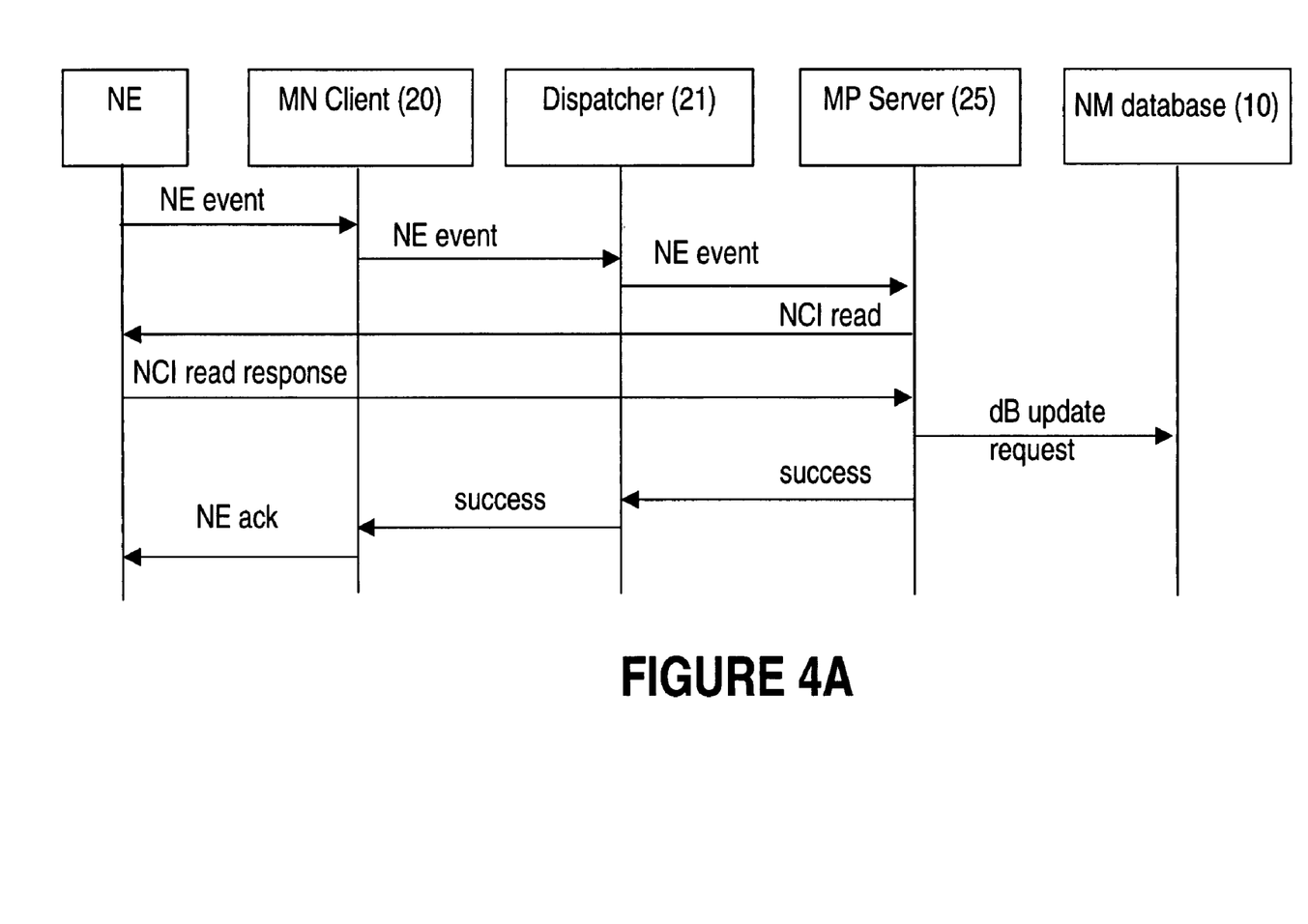
FIG. 4A shows the sequence for processing a network element (NE) event requiring a network control interface (NCI) read.

FIG. 4A depicts the sequence that occurs when an update is performed on a local database and the respective event requires more information from the NE. The sequence is similar to that of FIG. 3B, but as part of the event processing, the server performs more NCI reads to get the required additional information. Eventually, the NCI read response arrives from the NE and the server 25 updates all relevant information in the database and returns a success code which is forwarded to the client process 20, at which point the network event is acknowledged. This scenario is necessitated by the behavior of certain nodes with respect to certain database items, and should be avoided if at all possible since it is more expensive on network resources.

Figure 4B:
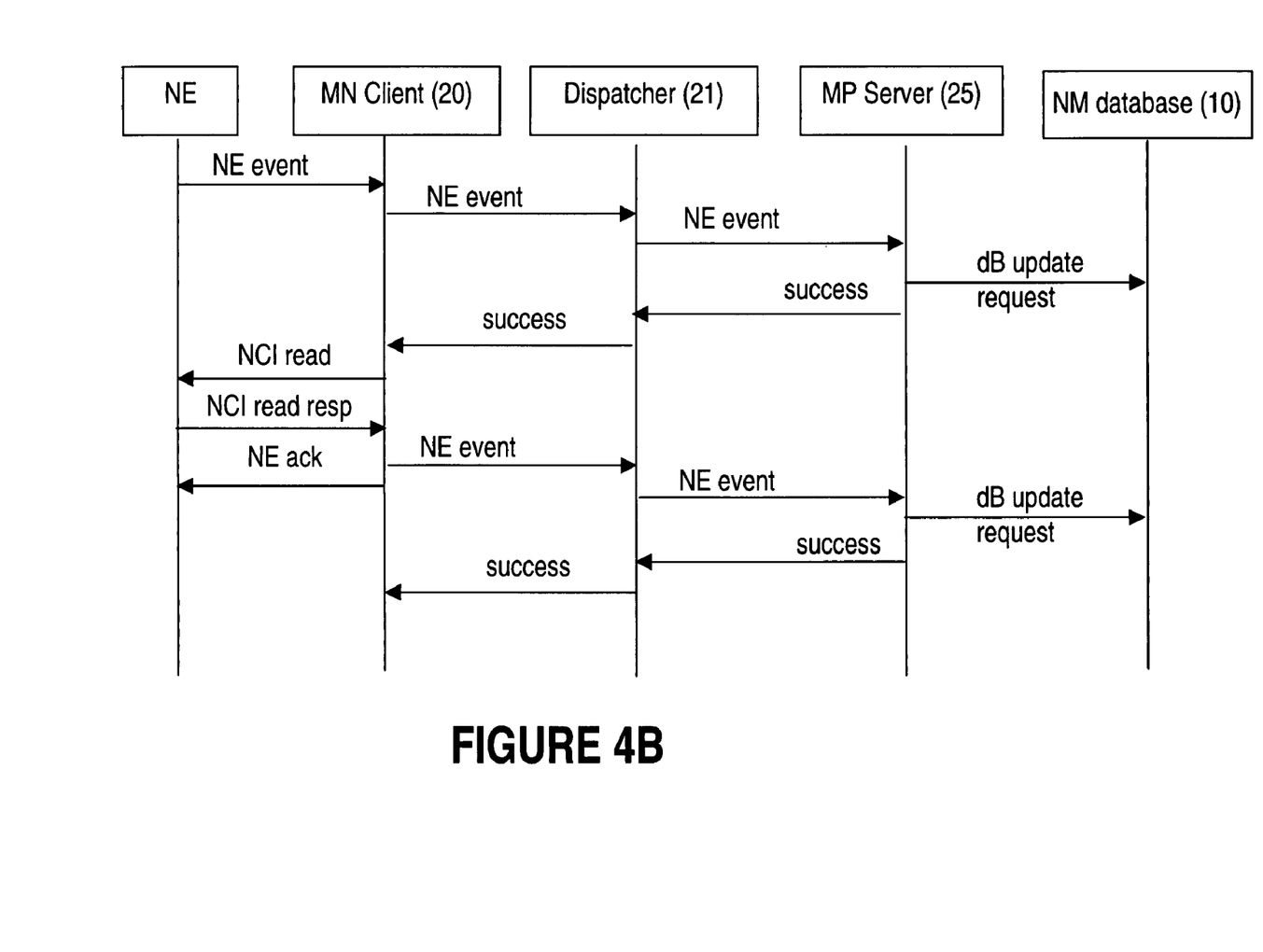
FIG. 4B illustrates an alternative to the sequence shown in FIG. 4A.

FIG. 4B illustrates an alternative to the sequence depicted in FIG. 4A, with a difference in the manner in which the additional information is read. Thus, the sequence starts out with the NE event being dispatched to a free server 25, but the success code returned from the server is a list of additional information that need to be read from the NE. When client 20 receives the successful completion of the network event processing, it issues a non-blocking NCI read of the additional information before acknowledging the original event. Eventually, the NCI read response arrives from the NE and is handled as if it were another NCI event—i.e. the event is passed to the server. From there, the sequence repeats. Note that it is entirely possible that the subsequent event handling yields another NCI read, although this is not depicted in the figure.

It is to be noted that this scenario shown in FIG. 4B decreases somewhat the efficiency of the event processing as often the same record is updated, causing the key conversion, record get, and record update to happen multiple times instead of once. Also, it increases complexity of the architecture. With a multi-server architecture it makes more sense to increase the number of servers to account for the number of servers that are (or may be) blocked waiting for network reads.

We claim:

1. In a communication network of the type having a master database and a plurality of local databases at respective network nodes, an event processing system (EPS) comprising:
   a message processing client for placing a plurality of events sequentially in a plurality of event queues, an event queue per node;
   a plurality of message processing servers, one server for processing at a given time an event from a particular event queue relating to a particular node, generating a certain change request for a certain event and transmitting said certain change request to a specified database; and
   a dispatcher for selecting said one server based on availability of said message processing servers at said given time, so that no other server of said plurality of message processing servers processes another event from said particular event queue at said given time.

2. The EPS of claim 1, further comprising a change notifier process for transmitting a network event received from a plurality of network management processes to said message processing client.

3. The EPS of claim 2, wherein said network event refers to a change in said master database.

4. The EPS of claim 1, wherein said particular event queue comprises one or more network events affecting said master database.

5. The EPS of claim 4, wherein said specified database is a local database.

6. The EPS of claim 1, wherein said particular event queue comprises network element (NE) events generated by said particular node reflecting respective updates in a local database maintained by said particular node.

7. The EPS of claim 6, wherein said specified database is said master database.

8. The EPS of claim 1, wherein each said event is time-stamped for maintaining the order of said change requests, for updating said specified database according to the order of the events.

9. The EPS of claim 1, wherein said particular event queue comprises a node identification for enabling said message processing client to place all events relating to said particular node into said particular event queue.

10. The EPS of claim 1, wherein said plurality of events include network events generated by network processes and network element (NE) events generated by network nodes.

11. The EPS of claim 1, wherein said message processing client further maintains an outstanding queue for tracking a current event being processed for a node.

12. The EPS of claim 11, wherein said outstanding queue comprises a node identification associated to a message identification for all events processed by all said servers at any given time.

13. The EPS of claim 12, wherein said outstanding queue uses a maximum outstanding limit for limiting the number of nodes that have events being processed at any one time.

14. The EPS of claim 13, wherein said maximum outstanding limit depends on the number of said message processing servers.

15. The EPS of claim 13, wherein said message processing client further maintains an overflow queue, for enabling deferred processing of additional events arriving at said message processor client after said outstanding queue reached said maximum outstanding limit.

16. The EPS of claim 15, wherein said overflow queue keeps said node identification for each additional event.

17. The EPS of claim 1, wherein the number of said message processing servers is dynamically configurable based on a current event processing load.

18. The EPS of claim 1, further comprising a shared object library with specific processing instructions for each event type handled by said message processing servers.

19. In a communication network of the type having a master database and a plurality of local databases at respective network nodes, a method of processing a plurality of database events comprising the steps of:
   a) maintaining a plurality of event queues at a message processing client, a particular event queue being associated to a particular network node;
   b) dispatching said events from each of said event queues to a plurality of message processing servers;
   c) processing simultaneously said events at said message processing servers, one server for processing a certain event from said particular event queue, while no other server of said plurality of message processing servers processes another event from said particular event queue during the time said one server processes said event; and wherein said step b) comprises:

selecting said one server based on the availability of said message processing servers;

checking if all servers that are currently processing events do not process another event from said particular event queue;

transmitting said certain event from said particular event queue to said one server for processing; and freeing said one server for processing another event from any of said plurality of event queues once said certain event has been processed.

20. The method of claim 19, further comprising maintaining at said message processing client an outstanding queue for tracking each event being currently processed for each network node.

21. The method of claim 20, wherein said step of maintaining an outstanding queue comprises providing a maximum outstanding limit for limiting the number of nodes that have network events being processed at any given time.

22. The method of claim 21, further comprising the step of maintaining an overflow queue for enabling deferred processing of events arriving at said message processing client after said outstanding queue reached said maximum outstanding limit.

23. The method of claim 19, wherein step c) comprises, consulting at each message processing server a shared object library for specific event processing instructions regarding the type of an event currently handled by said respective message processing server.

24. The method of claim 19, wherein said certain event is a network event generated by a network process in response to an update in said master database affecting a local database at said particular network node.

25. The method of claim 24, wherein said step a) comprises:

associating a node identification to said network event for identifying said particular network node affected by said network event; and providing said network event with a time-stamp, and placing said network event in said particular event queue according to said node identification and said time-stamp.

26. The method of claim 25, wherein said step a) further comprises:

generating at said one server a message identification for identifying said network event among all events being currently processed by said message processing servers; and at said message processing client, associating said message identification to said network event and organizing an outstanding queue based on said node identification and said message identification.

27. The method of claim 24, further comprising the step of transmitting from said particular network node to said one server an acknowledgement message indicating that said local database was successfully updated.

28. The method of claim 19, wherein said event is a network element (NE) event generated in response to an update in a local database of a particular network node affecting said master database.

29. The method of claim 28, wherein said step a) comprises:

associating a node identification to said NE event for identifying said particular network node that generated said NE event; and providing said NE event with a time-stamp, and placing said NE event in said particular queue according to said node identification and said time-stamp.

30. The method of claim 29, wherein said step a) further comprises:

generating at said one server a message identification for identifying said NE event among all events being currently processed by said message processing servers;

at said message processing client, associating said message identification to said NE event and organizing an outstanding queue based on said node identification and said message identification.

31. The method of claim 28, further comprising transmitting from said message processing client to said particular network node an acknowledgement message indicating that said master database was successfully updated.

32. The method of claim 31, further comprising resending a NE event from said particular network node if said acknowledgement message is not received in a pre-set time interval.

* * * * *